Figure 1:
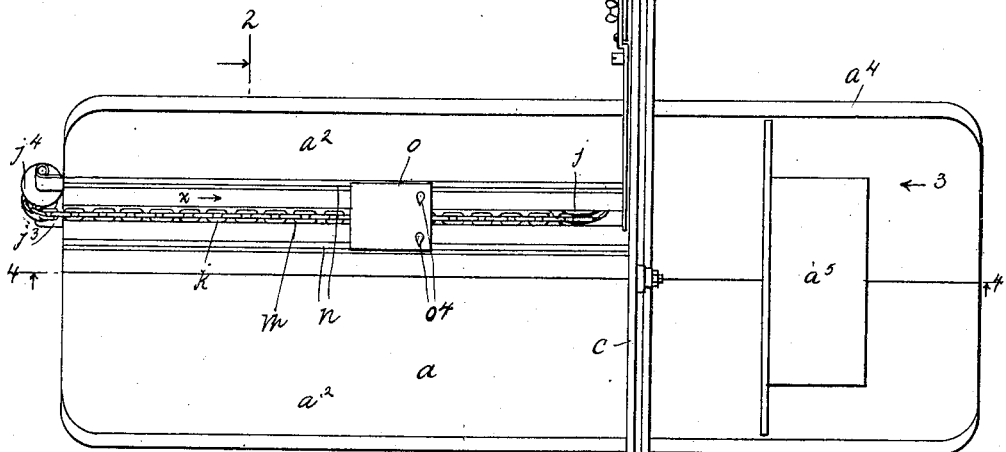

No. 898,163. PATENTED SEPT. 8, 1908.
N. M. ANDERSEN.
BREAD CUTTING DEVICE.
APPLICATION FILED SEPT. 10, 1907.

2 SHEETS—SHEET 1.

WITNESSES
A. Worden Gibbs.
C. E. Mulreany

INVENTOR
Niels M. Andersen.

BY Edgar Tate & Co
ATTORNEYS

No. 898,163. PATENTED SEPT. 8, 1908.
N. M. ANDERSEN.
BREAD CUTTING DEVICE.
APPLICATION FILED SEPT. 10, 1907.
2 SHEETS—SHEET 2.
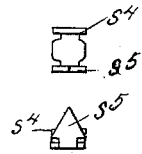
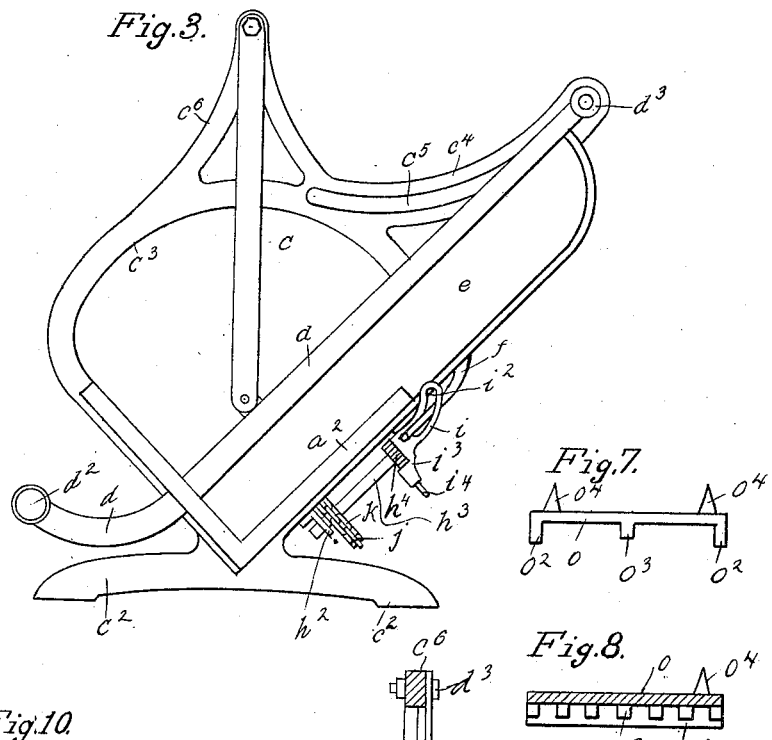
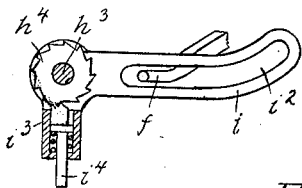
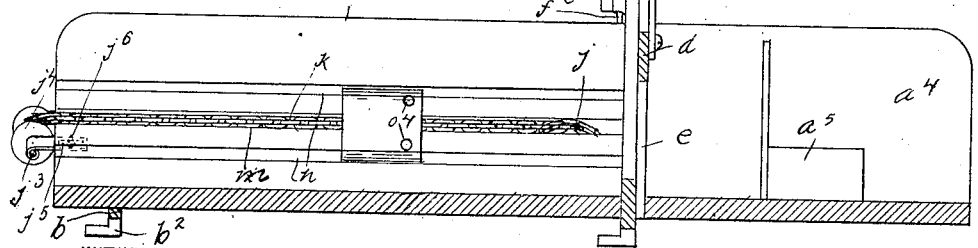
WITNESSES
INVENTOR
Niels M. Andersen
BY
Edgar Tate
ATTORNEYS

UNITED STATES PATENT OFFICE.

NIELS M. ANDERSEN, OF DETROIT, MICHIGAN.

BREAD-CUTTING DEVICE.

No. 898,163.  Specification of Letters Patent.  Patented Sept. 8, 1908.

Application filed September 10, 1907. Serial No. 392,118.

*To all whom it may concern:*

Be it known that I, NIELS M. ANDERSEN, a citizen of the United States, and residing at Detroit, in the county of Wayne and State of Michigan, have invented certain new and useful Improvements in Bread-Cutting Devices, of which the following is a specification, such as will enable those skilled in the art to which it appertains to make and use the same.

This invention is an improvement on the bread cutting device described and claimed in U. S. Letters Patent granted to me January 3, 1905, Serial No. 779,110, and the object thereof is to improve the said bread cutting device so as to facilitate the operation thereof and render the construction more simple and effective; a further object being to provide a bread cutting device in which a loaf of bread is automatically fed forward a predetermined distance at each movement of the cutter.

The invention is fully disclosed in the following specification, of which the accompanying drawing forms a part, in which the separate parts of my improvement are designated by suitable reference characters in each of the views, and in which;—

Figure 2:
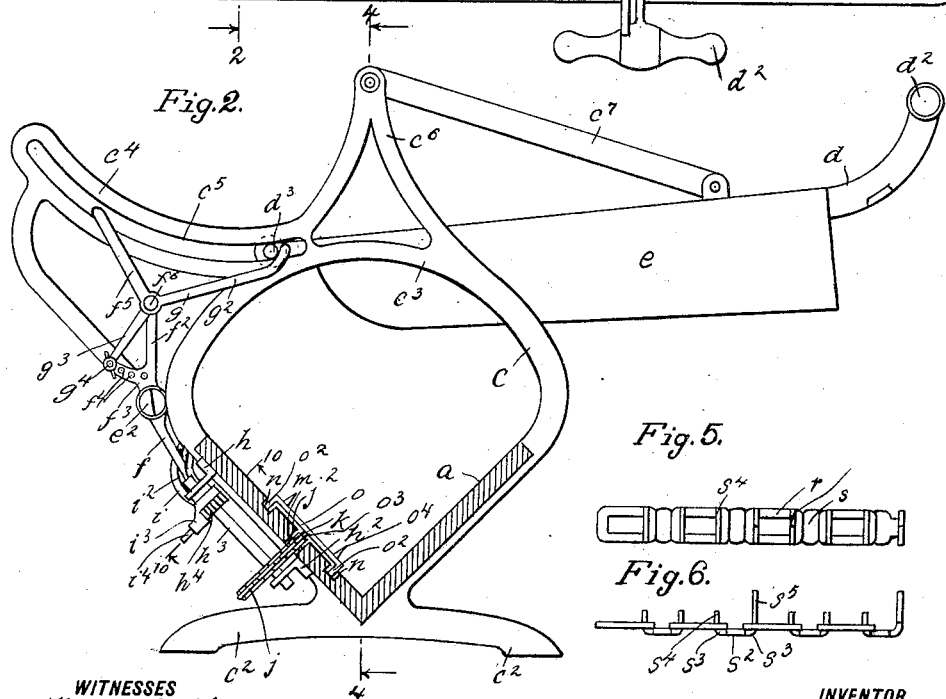
Figure 5:
Figure 6:
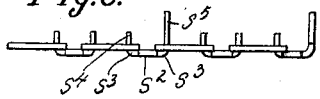

Figure 1 is a plan view of my improved bread cutting device; Fig. 2 a transverse section on the line 2—2 of Fig. 1; Fig. 3 an end view looking in the direction of the arrow 3 of Fig. 1; Fig. 4 a longitudinal section on the line 4—4 of Fig. 2 and on the line 4—4 of Fig. 1; Fig. 5 a plan view of a part of one form of a feed chain I may employ in my improved bread cutting device; Fig. 6 a side view thereof; Fig. 7 an end view of a carrier or feed plate which I employ; Fig. 8 a longitudinal section of said plate; Fig. 9 a plan and end view of one link of the chain shown in Figs. 5 and 6; and, Fig. 10 a partial section on the line 10—10 of Fig. 2.

In the practice of my invention, as shown in the drawing, I provide a tray $a$ which is rectangular or V-shaped in cross section and open at the top and preferably open at both ends, and one end of which is provided with a support $b$ having legs $b^2$ and to the other end of which is secured an irregular V-shaped frame or support $c$ having legs $c^2$ and a curved or circular top or crown portion $c^3$ and the back of which is extended to form an arm $c^4$ having a segmental slot or opening $c^5$ formed partially in said arm and partially in the top or crown piece $c^3$. The top or crown piece $c^3$ is also provided with an upwardly directed member $c^6$, to which is pivoted a link $c^7$ which is also pivoted to a bar $d$, to which is secured a blade $e$, and the bar $d$ is provided at one end with a handle $d^2$ and at the opposite end with a pin, screw or bolt $d^3$ which passes through the slot $c^5$ in the top or crown piece $c^3$ and is free to move therein.

Pivoted at $e^2$ in the back portion of the frame or support $c$ is a downwardly directed supplemental lever $f^3$ having an upwardly directed arm $f^2$ and a backwardly and upwardly directed arm $f^3$ which is shorter than the arm $f^2$, and the arm $f^3$ is provided with holes $f^4$ and the arm $f^2$ is provided with a backwardly and upwardly directed extension $f^5$. Pivoted to the arm $f^2$ at $f^6$ is a lever $g$ comprising a longer arm $g^2$ which extends upwardly and forwardly and a shorter arm $g^3$ which extends downwardly and backwardly, and the arm $g^3$ is pivoted to the arm $f^3$ of the lever $f$ by means of a detachable screw, pin or bolt $g^4$.

Secured to the back of the side $a^2$ of the tray $a$ adjacent to the end support or frame $c$ are bearings $h$ and $h^3$ through which is passed a shaft $h^3$ to which is secured a curved arm $i$ which projects outwardly of the frame or support $c$ and is provided with a segmental slot $i^2$ through which the end of the lever $f$ passes and in which said end of said lever is free to move, and the arm $i$ is provided with a circular head through which the shaft $h^3$ passes, and mounted on the shaft $h^3$ is a ratchet wheel $h^4$, and the head of the arm $i$ is provided with a downwardly directed projection $i^3$ in which is mounted a spring operated pawl $i^4$ which operates in connection with the said ratchet wheel.

Secured to the end portion of the shaft $h^3$ adjacent to the bottom portion of the tray is a sprocket wheel $j$ which extends through a corresponding slot $j^2$ in the side $a^2$ of the tray and at the opposite end of the side $a^2$ of the tray is a support $j^3$ in which is mounted a wheel $j^4$. The support $j^3$ is provided with longitudinal slots $j^5$ through which are passed screws or bolts $j^6$ which secure said support to the side $a^2$ of the tray, and by means of this construction the said support is adjusted longitudinally of the tray.

Mounted on the sprocket wheel $j$ and on the wheel $j^4$ is a drive chain $k$ and the inner or front side of the side $a^2$ of the tray is provided with a longitudinal slot or groove $m$ through which the said chain passes. The said front or inner surface of the side $a^2$ of the tray $a$ is provided with grooves $n$ parallel with the groove $m$ through which the drive chain $k$ passes, and I also employ a carrier or feed plate $o$ shown in detail in Figs. 7 and 8 having side flanges $o^2$ adapted to enter the grooves $n$ and provided centrally of its underside with teeth $o^3$ adapted to engage the links of the drive chain $k$. The tray $a$ is also provided at the right hand end thereof with an extension $a^4$ which is connected with the frame or support $c$ and is similar in form in cross section to said tray or support, and, in practice, I place in the extension $a^4$ of said tray $a$ a movable block $a^5$.

In practice, or in the operation of this device, it is secured to a table or other support in the position shown in Figs. 1 and 2 and a loaf of bread is placed in the tray and rests on the plate $o$, and said plate $o$ is provided with outwardly directed prongs or teeth $o^4$ adapted to engage the loaf of bread. It will be understood, of course, that the end of the loaf of bread is held in such position that at each downward movement of the knife a slice of bread will be cut off and at each upward movement of the knife the loaf of bread will be moved forwardly one step or a distance equal to the thickness of the slice of bread desired. The arm $f^5$ of the lever $f$ ranges upwardly and backwardly and in one of its positions crosses the segmental slot $c^5$, while the arm $g^2$ of the lever $g$ ranges upwardly and forwardly and in one of its positions also crosses said slot, and the end of said arm is curved as shown in Fig. 2 and is adapted to be operated upon by the head of the pivot pin or bolt $d^3$ which passes through said slot and with which the bar $d$ which carries the knife $e$ is connected.

Suppose the knife to be in its highest position as shown in Fig. 2, if, now, the said knife be depressed, the end of the bolt or screw $d^3$ will strike the end of the arm $f^5$ and a slice of bread will be cut off, and in this operation the arm $f^5$ is depressed and the arm $g^2$ raised. In the upward movement of the blade $e$ the arm $g^2$ is depressed and the arm $f^5$ raised, and in this operation the lever $f$, which is operated by the downwardly directed extension $g^3$ of the lever $g$, operating in connection with the arm $i$ operates said arm to turn the shaft $h^3$ and the pawl $i^4$ operating in connection with the ratchet wheel $h^4$ prevents the backward movement of said shaft and the result of this operation is to advance the loaf of bread one step and at the next downward movement of the knife another slice of bread is cut off and this operation may be repeated as often as desired.

It will be understood that at the beginning of the cutting of slices from the loaf of bread, the block $a^5$ is placed closely adjacent to the frame or support $c$, and as the operation of cutting off slices from the said loaf proceeds, the said slices rest against the block $a^5$ and said block is gradually pushed to the right and holds said slices in an upright position and the said slices of bread may be removed from the extension $a^4$ of the tray $a$ at any time and the block $a^5$ replaced adjacent to the frame or support $c$.

It will be observed that the feed chain $k$ passes longitudinally around the side $a^2$ of the tray $a$ and is movable only in the direction of the arrow $x$, Fig. 1, in the operation of the said device as hereinbefore described, and said movement is an intermittent movement, the extent thereof depending upon the point at which the extension $g^3$ of the lever $g$ is connected with the arm $f^3$ of the lever $f$.

In Figs. 5, 6 and 9 inclusive I have shown a form of feed chain which may be substituted for the feed chain $k$ and said chain consists of two separate detachably connected links $r$ and $s$. The links $r$ are oblong in form and the links $s$ comprise a central transversely arranged portion $s^2$ at each side of which are neck portions $s^3$, and, in practice, the necks $s^3$ are passed through the links $r$ and project as shown at $s^4$ and $s^5$, and said projections or one of them may be formed into prongs as shown in Fig. 9 to engage the loaf of bread when it is placed thereon, so that said loaf of bread will be fed forward in the direction of the frame or support $c$ as the knife, comprising the bar $d$ and blade $e$, is operated, and with this form of feed chain the plate $o$ will not be necessary.

It will be apparent that this device may be used for slicing or cutting many other articles as well as bread, and, within the scope of the appended claims, changes in and modifications of the construction herein described may be made without departing form the spirit of my invention or sacrificing its advantages.

Having fully described my invention, what I claim as new and desire to secure by Letters Patent, is:—

1. A bread cutting device, comprising a tray provided at one end with an open main frame having an upwardly directed member and backwardly directed arm, said member and said arm being provided with a curved slot, a link pivoted to a support at the top of said member, a knife bar pivoted to said link and provided with a pin movable in said slot, a shaft mounted transversely of the back of the tray adjacent to said frame or support, a sprocket wheel connected with said shaft, another sprocket wheel mounted at the opposite end of the tray, a feed chain mounted on said wheels and passing around and longitudinally of the back side of the tray, and movable in a longitudinal groove in the front of the said back side of the tray, a curved and slotted arm loosely mounted on said shaft, a ratchet wheel connected with said shaft, a spring pawl carried by said arm and acting on said ratchet wheel, a lever pivoted in said frame above said shaft and operating in the slot in said arm, said lever being provided with an upwardly and backwardly directed extension and rearwardly thereof with a backwardly and upwardly directed extension which is shorter than the first named extension, a supplemental lever pivoted to the upwardly and backwardly directed extension of the first named lever, centrally thereof and provided with a forwardly and upwardly directed arm, and with a backwardly and downwardly directed member, and means for adjustably connecting the last named member of the supplemental lever with the backwardly and upwardly directed extension of the first named lever, both of said levers being adapted to be operated by the pin or bolt connected with the knife and operating in the curved slot formed in the main frame and the backwardly and upwardly directed arm thereof.

2. A bread cutting device, comprising an oblong tray V-shaped in cross section, an open main frame connected with one end of said tray and provided in the rear top portion thereof with a curved slot, a link pivoted in the top portion of the main frame, a knife pivoted to said link and provided at its front end with a handle, and at its rear end with a pin or bolt movable in said curved slot, a shaft mounted transversely of the back side of the tray adjacent to the main frame, a sprocket wheel on said shaft, another sprocket wheel mounted at the opposite end of the tray, a feed chain mounted on said wheels and passing around and longitudinally of the back side of the tray, a lever pivoted in the main frame above said shaft and extending in the same direction, said lever being provided with an upwardly and backwardly directed extension and rearwardly thereof with a backwardly and upwardly directed extension shorter than the first named extension, a supplemental lever pivoted to the upwardly and backwardly directed extension of the first named lever and provided with a forwardly and backwardly directed arm and a backwardly and downwardly directed member adapted to be adjustably connected with the backwardly and upwardly directed extension of the first named lever, both of said levers being adapted to be operated by the pin or bolt connected with the knife and movable in said curved slot, and means whereby the operation of said lever by the upward and downward movement of said knife will rotate said shaft in one direction step by step.

In testimony that I claim the foregoing as my invention I have signed my name in presence of the subscribing witnesses this 6th day of May, 1907.

NIELS M. ANDERSEN.

Witnesses:
C. E. MULREANY,
A. WORDEN GIBBS.